(12) United States Patent  
Gamache et al.

(10) Patent No.: US 7,976,103 B2
(45) Date of Patent: Jul. 12, 2011

(54) SEAT ASSEMBLY HAVING A SWITCH AND METHOD OF OPERATION

(75) Inventors: Steve Gamache, Canton, MI (US); Gerald Patrick, Shelby Township, MI (US); Suresh Veeramachaneni, Rochester Hills, MI (US)

(73) Assignee: Lear Corporation, Southfield, MI (US)

( * ) Notice: Subject to any disclaimer, the term of this patent is extended or adjusted under 35 U.S.C. 154(b) by 235 days.

(21) Appl. No.: 12/236,039

(22) Filed: Sep. 23, 2008

(65) Prior Publication Data

US 2010/0072772 A1 Mar. 25, 2010

(51) Int. Cl.
*B60N 2/02* (2006.01)
(52) U.S. Cl. .................. 297/362.11; 297/378.1; 297/341
(58) Field of Classification Search ............... 297/378.1, 297/378.12, 362.11, 362.12
See application file for complete search history.

(56) References Cited

U.S. PATENT DOCUMENTS

| 4,518,190 | A  | * | 5/1985 | Kluting et al. ............... 296/68.1 |
| 5,348,373 | A  |   | 9/1994 | Stiennon |
| 5,435,624 | A  | * | 7/1995 | Bray et al. ............... 297/362.11 |
| 5,507,560 | A  |   | 4/1996 | Frusti et al. |
| 6,722,736 | B2 |   | 4/2004 | Guillot |
| 6,905,173 | B2 |   | 6/2005 | Tame et al. |
| 7,066,543 | B2 | * | 6/2006 | Yu ............................ 297/378.12 |
| 7,367,624 | B2 | * | 5/2008 | Garland ................... 297/362.11 |
| 7,500,719 | B2 | * | 3/2009 | Kojima ......................... 297/362 |
| 2003/0155799 | A1 |   | 8/2003 | Guillot |
| 2004/0090102 | A1 |   | 5/2004 | Tame et al. |
| 2010/0026073 | A1 | * | 2/2010 | Bruck et al. ............... 297/378.1 |

* cited by examiner

*Primary Examiner* — Sarah B McPartlin
(74) *Attorney, Agent, or Firm* — Brooks Kushman P.C.

(57) ABSTRACT

A seat assembly and a method of control. The seat assembly includes a power recliner assembly that allows a seat back to pivot with respect to a seat bottom. The power recliner assembly includes a motor for rotating a recliner mechanism. A switch assembly is electrically coupled to the motor and disables operation of the motor when in an open condition.

20 Claims, 3 Drawing Sheets

SEAT ASSEMBLY HAVING A SWITCH AND METHOD OF OPERATION

BACKGROUND OF THE INVENTION

Field of the Invention

The present invention relates to a seat assembly having a switch that disables operation of a power recliner motor and a method of operation.

SUMMARY OF THE INVENTION

In at least one embodiment, a seat assembly is provided. The seat assembly includes a seat bottom, a seat back, a power recliner assembly mounted to the seat bottom and the seat back that allows the seat back to pivot with respect to the seat bottom, a switch assembly, and an easy entry release mechanism for actuating the power recliner assembly to a released condition in which the seat back is free to pivot toward the seat bottom independent of operation of the motor. The power recliner mechanism has a recliner mechanism and a motor for rotating the recliner mechanism. The switch assembly is electrically coupled to the motor and has an open condition in which operation of the motor is disabled and a closed condition in which operation of the motor is enabled. The switch assembly is in the open condition when the easy entry release mechanism is in the released condition.

In at least one other embodiment, a vehicle seat assembly is provided. The vehicle seat assembly has a seat bottom, a seat back, a power recliner assembly, and a switch assembly disposed on the power recliner assembly and electrically coupled to the motor. The power recliner assembly includes a lower mounting bracket assembly disposed on the seat bottom, a recliner mechanism heart disposed on the lower mounting bracket assembly, a torque rod that engages the recliner mechanism heart, a motor disposed on and configured to rotate the torque rod, an upper mounting bracket assembly fixedly disposed on the seat back, and a recliner center freeswing mechanism fixedly disposed on the upper mounting bracket assembly. The switch assembly disables operation of the motor when the recliner center freeswing mechanism is disengaged from the recliner mechanism heart.

In at least one other embodiment, a method of controlling operation of a vehicle seat assembly is provided. The method includes releasing a seat back to freely pivot toward a seat bottom and disabling operation of the motor when the seat back is released.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
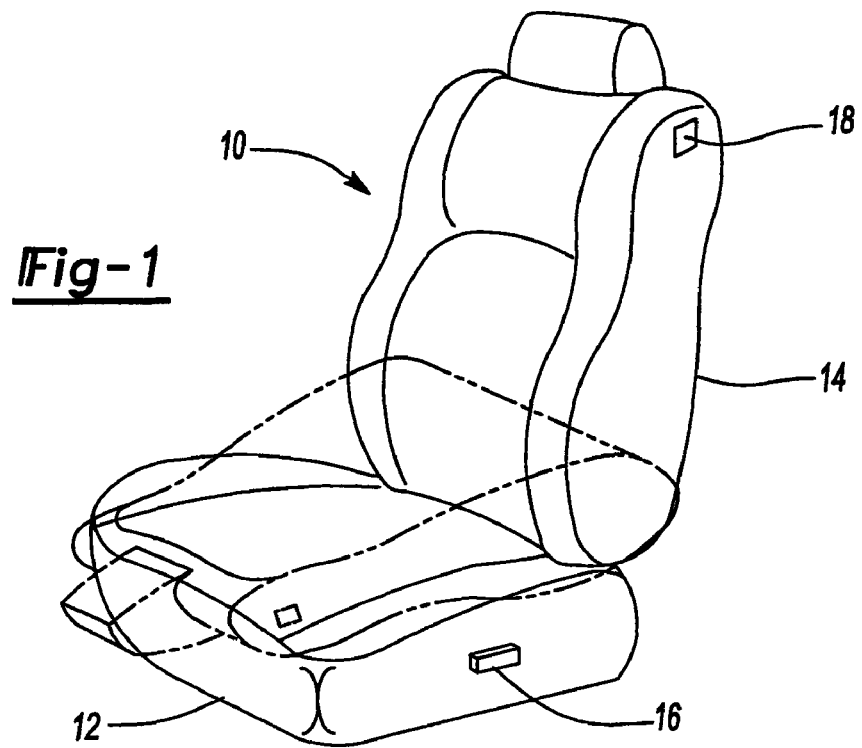
FIG. 1 is a perspective view of a seat assembly.

Referring to FIG. 1, an exemplary seat assembly 10 is shown. The seat assembly 10 may be configured for use in a vehicle, such as a motor vehicle like a car or truck.

The seat assembly 10 may include a seat bottom 12 and a seat back 14. The seat bottom 12 may be configured to be mounted on a support surface, such as a floor pan of a vehicle. At least one track assembly may be coupled to the seat bottom 12 to facilitate fore and aft positioning of the seat assembly 10. The seat back 14 may be pivotally disposed on the seat bottom 12 as will be described in more detail below. In FIG. 1, the seat back 14 is shown in an upright or seating position in solid lines and in a folded or "dumped" position in phantom.

The seat assembly 10 may also include one or more devices that may be used to control the positioning or operation of various seat components. For instance, the seat assembly 10 may include one or more control switches that may be used to control the positioning of the seat bottom 12, the seat back 14, or components thereof. In at least one embodiment, a control switch 16 may be provided that allows a user to control the operation of a motor that may pivot the seat back 14 toward or away from the seat bottom 12. In addition, the seat assembly 10 may also include an input device 18, such as a button, lever, or handle, for an easy entry release system as will be discussed in more detail below.

Figure 2:
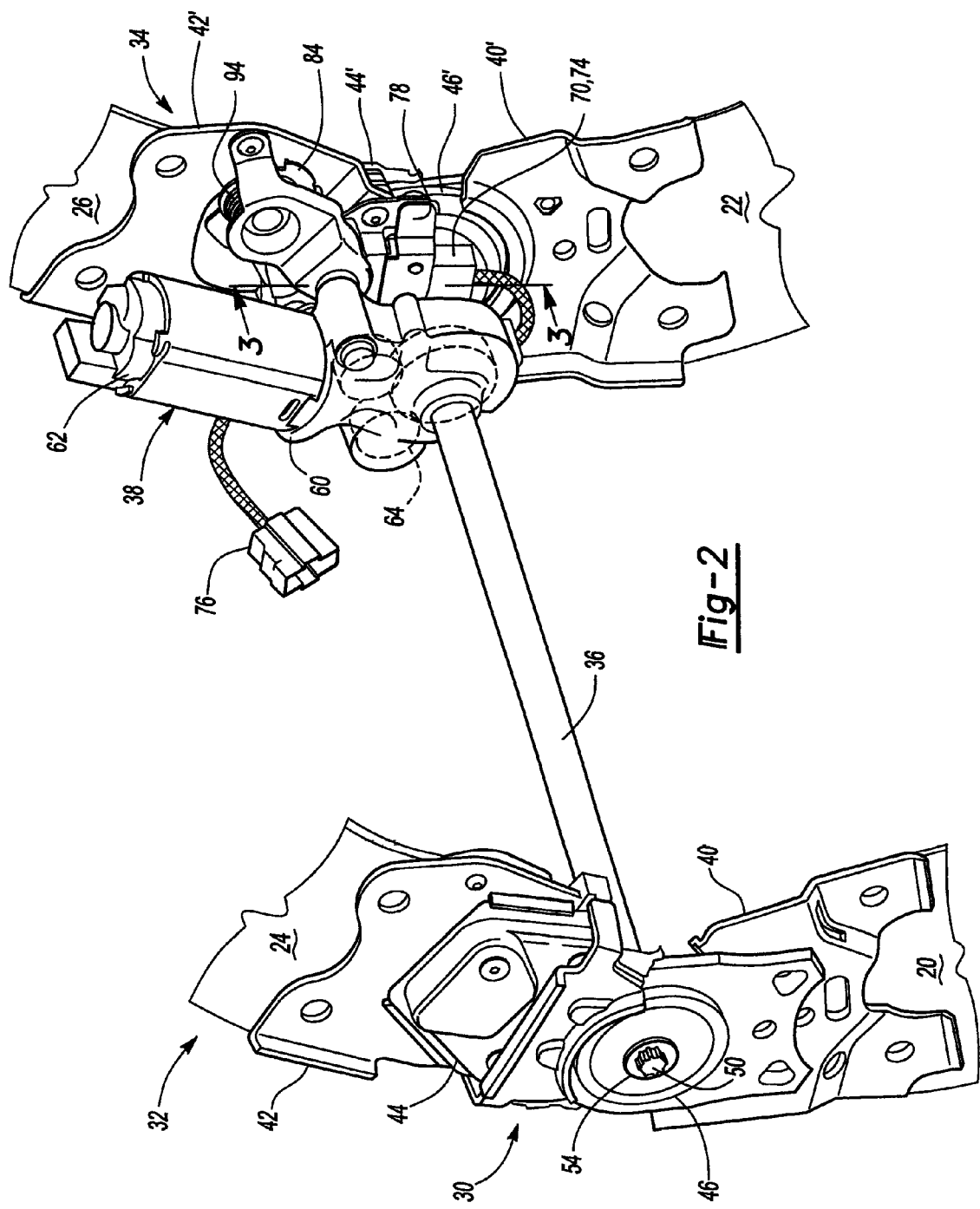
FIG. 2 is a fragmentary perspective view of a portion of the seat assembly.

Referring to FIG. 2, some components of the seat assembly 10 are shown in more detail. The seat bottom 12 and seat back 14 may each include structural frames that may have any suitable configuration. In at least one embodiment, the seat bottom frame may include first and second side members 20, 22 disposed opposite each other and one or more cross members (not shown) that extend between the first and second side members. Similarly, the seat back frame may include first and second side members 24, 26 disposed opposite each other and one or more cross members (not shown) that extend between the first and second side members.

A power recliner assembly 30 may be provided that pivotally connects the seat back 14 to the seat bottom 12. The power recliner assembly 30 may include a first side portion 32, a second side portion 34, a torque rod 36, and a power recliner motor assembly 38.

The first and second side portions 32, 34 of the power recliner assembly 30 may have similar configurations. For example, the first and second side portions 32, 34 may generally be mirror images of each other.

The first side portion 32 may include an upper mounting bracket assembly 40, a lower mounting bracket assembly 42, a recliner center freeswing mechanism 44, and a recliner heart 46. Similarly, the second side portion 34 may include a lower mounting bracket assembly 40', an upper mounting bracket assembly 42', a recliner center freeswing mechanism 44', and a recliner heart 46'.

The lower mounting bracket assemblies 40, 40' may be disposed on the seat bottom frame in any suitable manner. For instance, the lower mounting bracket assemblies 40, 40' may be fixedly mounted on the first and second seat bottom side members 20, 22, respectively, using fasteners, welding, or the like.

The upper mounting bracket assemblies 42, 42' may be disposed on the seat back frame in any suitable manner. For instance, the upper mounting bracket assemblies 42, 42' may be fixedly mounted on the first and second side members 24, 26, respectively, using fasteners, welding, or the like.

A recliner center freeswing (CF) mechanism 44, 44' may be disposed on each upper mounting bracket assembly 42, 42'. The recliner center freeswing mechanism 44, 44' cooperates with an associated recliner heart 46, 46' to facilitate actuation of the seat back 14 with respect to the seat bottom 12. Moreover, the recliner center freeswing mechanism 44, 44' may disengage from the recliner heart 46, 46' when the seat back 14 is released by an easy entry release system that allows the seat back 14 to be "dumped" or made free to pivot forward or over the seat bottom 12 independent of the operation of electrical components, such as the power recliner motor assembly 38.

The recliner mechanism heart 46, 46' or recliner mechanism may be disposed on or received by the lower mounting bracket assembly 40, 40'. The recliner heart 46, 46' is configured to control pivotal movement of the seat back 14 in a manner known by those skilled in the art.

The torque rod 36 may transmit torque from the power recliner motor assembly 38 to the recliner hearts 46, 46'. For instance, the torque rod 36 may include first and second ends 50, 52 disposed opposite each other that engage the recliner hearts 46 and 46', respectively. A fastener 54, such as a push nut, may be provided to secure the first and second ends 50, 52 to the recliner hearts 46, 46'. As such, the torque rod 36 may interconnect the recliner hearts 46, 46' to synchronize their operation. At least a portion of the torque rod 36 may be disposed in a sleeve, such as a hollow tube, to help shield the torque rod 36 from its surroundings.

The power recliner motor assembly 38 may be configured to rotate the torque rod 36. The power recliner motor assembly 38 may include a housing 60 that at least partially receives an electric motor 62 and a gear set 64. The housing 60 may be coupled to part of the seat assembly 10, such as the seat back 14 or a portion of the power recliner assembly 30 like the upper mounting bracket assembly 42' to help hold the power recliner motor assembly 38 in position. At least one member of the gear set 64 may be disposed on or configured to engage the torque rod 36. As such, the electric motor 62 may drive the gear set 64 and transmit force to the torque rod 36. The electric motor 62 may be bidirectional. As such, the power recliner motor assembly 38 may be configured to rotate the torque rod 36 in a first direction to actuate the seat back 14 toward the seat bottom 12 and in a second direction to actuate the seat back 14 away from the seat bottom 12.

Figure 3:
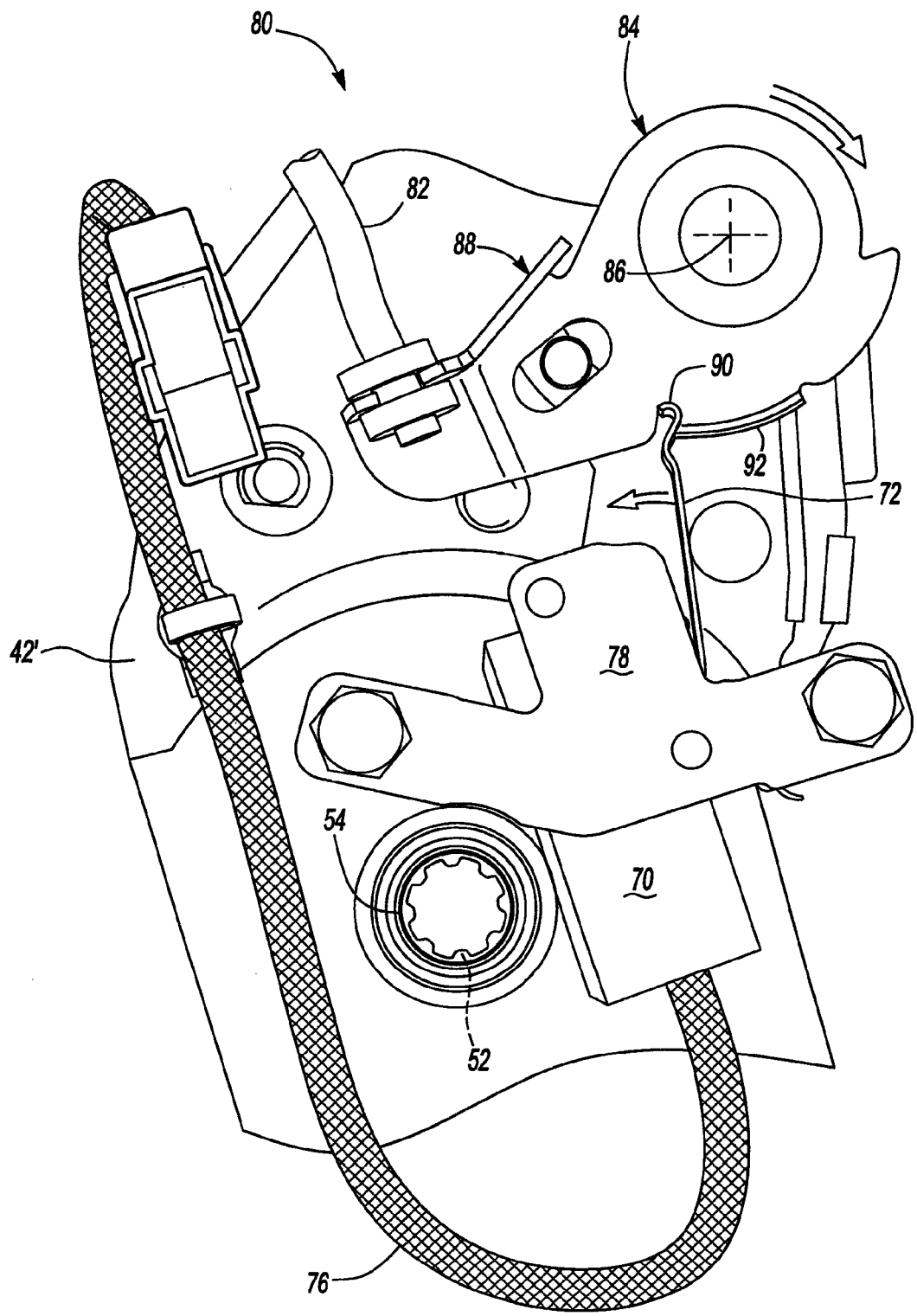
FIG. 3 is a section view of the seat assembly along line 3-3 in FIG. 2.

Referring to FIGS. 2 and 3, a switch assembly 70 may be provided to selectively enable or disable operation of the power recliner motor assembly 38. The switch assembly 70 may be of any suitable type. For instance, the switch assembly 70 may be Cherry D487 switch assembly and may include an actuator blade 72 that extends from the switch housing 74 and a wire harness 76 for coupling to an electrical circuit. The actuator blade 72 may engage a component that moves relative to the switch housing 74, such as a portion of an easy entry release mechanism as will be described in more detail below. The switch assembly 70 may be disposed in any suitable position. In at least one embodiment, the switch assembly may be disposed between the power recliner motor assembly 38 and the second side portion 34 of the power recliner assembly 30. A mounting bracket 78 may be provided to secure the switch assembly 70 to a portion of the seat assembly 10, such as the upper mounting bracket assembly 42'.

Figure 4:
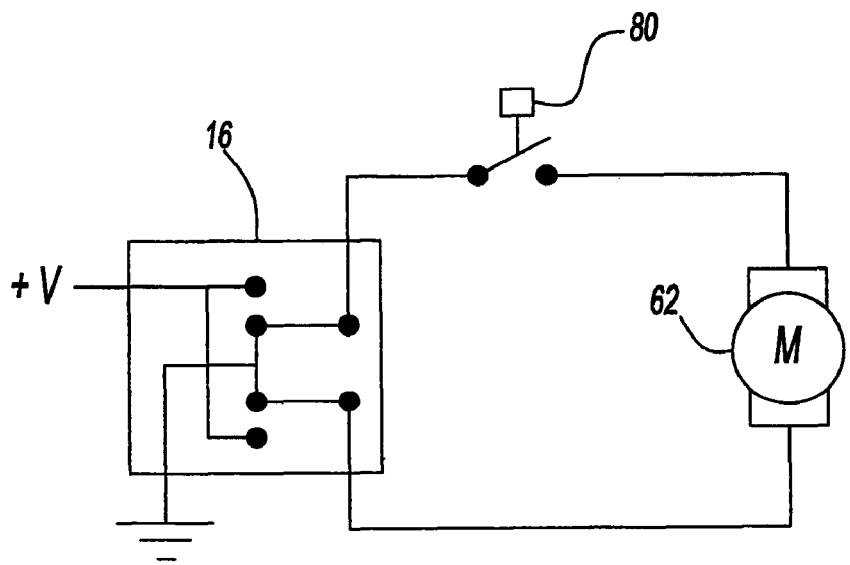
FIG. 4 is a circuit diagram of a control circuit for the seat assembly.

Referring to FIG. 4, a schematic of an electrical circuit associated with the switch assembly 70 is shown. The circuit includes control switch 16, switch assembly 70, and the electrical motor 62 of the power recliner motor assembly 38. The control switch 16 may be normally open and include first and second contacts. Actuation of the control switch 16 may move one of the contacts to the position shown in phantom. The switch assembly 70 may be switchable between a closed state and an open state. In the open state shown in FIG. 4, the switch assembly 70 disables operation of the power recliner motor assembly 38. In the closed state the switch assembly 70 may permit operation of the power recliner motor assembly 38. The switch assembly 70 may be configured such that it is normally closed so that the power recliner motor assembly 38 may operate if the switch assembly 70 fails to open.

The switch assembly 70 may be actuated by at least one component of an easy entry release system. As previously mentioned, an easy entry release system may allow the seat back 14 to be "dumped" or released so that it may pivot forward without being actuated by the power recliner motor assembly 38.

The easy entry release system may be provided in various embodiments. For instance, the input device 18 of the easy entry release system may communicate with the switch assembly 70 electrically, mechanically, or combinations thereof. In at least one embodiment, the input device 18 may be located near, in contact with, or may be integrated with the switch assembly 70. As such, the input device 18 may directly actuate the switch assembly 70.

In at least one other embodiment, the easy entry release system may be configured to initiate or generate a signal that may be used to control operation of the power recliner motor assembly 30. For instance, actuation of the input device 18 may trigger the generation and/or transmission of a control signal that may be used to control the switch assembly 70. The control signal may be transmitted wirelessly or electrically to the switch assembly 70 or a switch assembly control circuit that may process, decode, demodulate, or otherwise interpret the signal to toggle the switch assembly to a closed or open condition to enable or disable operation of the power recliner motor assembly 38.

Referring to FIG. 3, the easy entry release system may include a mechanical linkage that allows the input device 18 to be located apart from the switch assembly 70. For instance, the input device 18 may include a first mechanical linkage, such as a cable 82, that directly actuates the switch assembly 70. Optionally, additional mechanical linkages may be provided. For example, the first mechanical linkage may be coupled to a second mechanical linkage, such as a pivot lever 84. The pivot lever 84 may be rotatably disposed on the seat assembly 10 and rotate about an axis of rotation 86. The pivot lever 84 may include an arm portion 88 that includes an opening 90, such as slot, that engages or receives an end of the cable 82. The pivot lever 84 may also include an engagement feature 92, such as a protrusion or opening that engages or receives a portion of the switch assembly 70, such as the actuator blade 72. As such, actuation of the input device 18 may pull on the cable 82, thereby rotating the pivot lever 84 in a clockwise direction from the position shown in FIG. 3, such that the engagement feature 92 exerts force upon the actuator blade 72 to toggle the switch assembly 70 to the open condition. A spring 94 may be provided that exerts a biasing force to rotate the pivot lever 84 on the opposite direction and allow the switch assembly 70 to move to the closed condition when sufficient force is not exerted by the input device 18 and cable 82.

Regardless of the easy entry release system configuration, the present invention may help prevent damage to the power recliner motor assembly 38 by disabling its operation when the seat back 14 may freely pivot.

One scenario in which damage may occur to a power recliner motor assembly 38 is as follows. First, an operator may actuates the input device 18 of the easy entry release system to allow the seat back 14 to pivot from an initial position toward a folded position. Pivoting may occur due to force exerted by the operator and/or spring load exerted by the recliner heart 46, 46'. Pivoting of the seat back may allow the recliner center freeswing mechanism 44, 44' to disengage. Second, the operator may actuate the control switch 16 to attempt to tilt or retract the seat back 14 back to the initial position using the power recliner motor assembly 38. Actuation of the control switch will cause the power recliner motor assembly 38 to rotate the torque rod 36 and recliner heart 46, 46', but the rotation of the recliner heart 46, 46' will not actuate the seat back 14 while it is disengaged from the recliner center freeswing mechanism 44, 44'. Third, the operator may realize that the seat back 14 is not moving and may push the seat back 14 toward the initial position. The power recliner motor assembly 38 and its gear set 64 may be damaged when the recliner center freeswing mechanism reengages 44, 44'. More specifically, gears or gear teeth of the power recliner motor assembly 38 may break, shear, or be damaged by force transmitted via the recliner heart 46, 46' and torque rod 36 as a result of reengagement of the recliner center freeswing mechanism 44, 44' as it tries to align to the adjusted position of the recliner heart 46, 46'. Gear damage may result in noise, rough operation, or complete failure or the power recliner motor assembly 38.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly comprising:
    a seat bottom;
    a seat back;
    a power recliner assembly mounted to the seat bottom and the seat back that facilitates pivoting of the seat back with respect to the seat bottom, the power recliner mechanism including a recliner mechanism and a motor for rotating the recliner mechanism;
    a switch assembly electrically connected to the motor, the switch assembly having an open condition in which operation of the motor is disabled and a closed condition in which operation of the motor is enabled wherein the switch assembly further comprises an actuator blade that extends from the switch assembly; and
    an easy entry release mechanism for actuating the power recliner assembly to a released condition in which the seat back is free to pivot toward the seat bottom independent of operation of the motor, wherein the easy entry release mechanism further comprises a cable having a first end and a second end disposed opposite the first end, a handle coupled to the first end, and a lever coupled to the second end and rotatably disposed on the seat assembly, wherein the lever has a tab that engages the actuator blade and rotates when the handle is actuated to actuate the switch assembly from the closed condition to the opened condition;
    wherein the switch assembly is in the open condition when the easy entry release mechanism is in the released condition.

2. The seat assembly of claim 1 wherein the switch assembly is in the open condition when the seat back is folded against the seat bottom.

3. The seat assembly of claim 1 wherein the switch assembly is in the closed condition when the easy entry release mechanism is not activated.

4. The seat assembly of claim 1 wherein the easy entry release mechanism transmits an electrical signal for actuating the switch assembly to the open condition.

5. The seat assembly of claim 1 wherein the switch assembly is part of the easy entry release mechanism.

6. The seat assembly of claim 1 wherein the cable actuates the switch assembly.

7. The seat assembly of claim 1 wherein the actuator blade is disposed in an opening disposed proximate the tab.

8. The seat assembly of claim 1 wherein the lever is rotatably disposed on an upper mounting bracket disposed proximate the seat back.

9. The seat assembly of claim 1 wherein the lever rotates about an axis of rotation and further comprises an arm portion having an opening that receives the second end of the cable and the tab is generally disposed between the opening and the axis of rotation.

10. The seat assembly of claim 9 wherein the tab extends substantially parallel to the axis of rotation.

11. The seat assembly of claim 1 wherein the switch assembly is fixedly positioned on the power recliner assembly.

12. A vehicle seat assembly comprising:
    a seat bottom;
    a seat back;
    a power recliner assembly including:
        a lower mounting bracket assembly disposed on the seat bottom;
        a recliner mechanism heart disposed on the lower mounting bracket assembly;
        a torque rod that engages the recliner mechanism heart;
        a motor disposed on and configured to rotate the torque rod;
        an upper mounting bracket assembly fixedly disposed on the seat back; and
        a recliner center freeswing mechanism disposed on the upper mounting bracket assembly;
    a switch assembly disposed on the power recliner assembly and electrically coupled to the motor; and
    a lever configured to rotate with respect to the recliner mechanism heart that engages and actuates the switch assembly;
    wherein the switch assembly disables operation of the motor when the recliner center freeswing mechanism is disengaged from the recliner mechanism heart.

13. The seat assembly of claim 12 wherein the lever is rotatably disposed on the upper mounting bracket assembly, wherein the lever actuates the switch assembly between a closed position in which operation of the motor is enabled and an open position in which operation of the motor is disabled.

14. The seat assembly of claim 12 wherein the switch assembly disables operation of the motor when the seat back is pivoted toward the seat bottom.

15. The seat assembly of claim 12 wherein the switch assembly enables operation of the motor when the recliner center freeswing mechanism is reengaged with the recliner mechanism heart.

16. The seat assembly of claim 12 wherein the switch assembly is disposed between the motor and the power recliner assembly.

17. The seat assembly of claim 12 wherein at least a portion of the switch assembly is disposed above the torque rod.

18. The seat assembly of claim 12 wherein the switch assembly disables operation of the motor when the seat back is fully folded toward the seat bottom.

19. A method of controlling operation of a vehicle seat assembly having a power recliner assembly for adjusting the position of a seat back, the power recliner assembly having an electric motor, the method comprising:
  releasing a seat back to freely pivot toward a seat bottom; and
  disabling operation of the motor when the seat back is released;
  wherein a lever that rotates with respect to a recliner mechanism heart is configured to engage and actuate a switch assembly to disable operation of the electric motor, wherein the lever is coupled to a second end of a cable that has a first end coupled to a handle, wherein the lever has a tab that engages an actuator blade of the switch assembly and rotates when the handle is actuated to actuate the switch assembly from the closed condition to the opened condition.

20. The method of claim 19 wherein the switch assembly has an open condition in which operation of the motor is disabled and a closed condition in which operation of the motor is enabled; and
  an easy entry release mechanism for actuating the power recliner assembly to a released condition in which the seat back is free to pivot toward the seat bottom independent of operation of the motor;
  wherein the switch assembly is in the open condition when the easy entry is activated.

* * * * *